United States Patent [19]

Ranger

[11] Patent Number: 5,999,940
[45] Date of Patent: Dec. 7, 1999

[54] INTERACTIVE INFORMATION DISCOVERY TOOL AND METHODOLOGY

[75] Inventor: Denis Ranger, Morris Plains, N.J.

[73] Assignee: Home Information Services, Inc., New York, N.Y.

[21] Appl. No.: 08/915,662

[22] Filed: Aug. 21, 1997

Related U.S. Application Data

[60] Provisional application No. 60/047,998, May 28, 1997.

[51] Int. Cl.$^6$ .................................................. G06F 17/30
[52] U.S. Cl. ................................. 707/103; 707/104
[58] Field of Search ................................. 707/3, 4, 8, 7, 707/103, 104; 705/14

[56] References Cited

U.S. PATENT DOCUMENTS

| | | | |
|---|---|---|---|
| 5,491,820 | 2/1996 | Belove et al. ............................ | 707/3 |
| 5,548,726 | 8/1996 | Pettus ..................................... | 707/103 |
| 5,560,005 | 9/1996 | Hoover et al. ......................... | 707/10 |
| 5,692,180 | 11/1997 | Lee ....................................... | 707/10 |
| 5,740,549 | 4/1998 | Reilly et al. ........................... | 705/14 |
| 5,761,500 | 6/1998 | Gallant et al. ......................... | 707/10 |
| 5,761,663 | 6/1998 | Largarde et al. ...................... | 707/10 |
| 5,809,502 | 9/1998 | Burrows ................................. | 707/7 |
| 5,903,725 | 5/1999 | Coyler ................................... | 707/103 |

*Primary Examiner*—Thomas G. Black
*Assistant Examiner*—Charles L. Rones
*Attorney, Agent, or Firm*—McDermott, Will & Emery

[57] ABSTRACT

A interactive information discovery tool and method gathers information dynamically from one or more data sources, which may be located at different servers and have incompatible formats, structures the information into a configurable, object-oriented information model, and outputs the information for the user according to an associated, configurable visual representation with automatic content classification.

26 Claims, 8 Drawing Sheets

INTERACTIVE INFORMATION DISCOVERY TOOL AND METHODOLOGY

RELATED APPLICATION

This application claims the benefit of U.S. Provisional Application No. 60/047,998, entitled "Agent-Based Server," filed on May 28, 1997 by Denis Ranger, incorporated herein by reference.

TECHNICAL FIELD

The present invention relates to data processing and, more particularly, to information discovery and visualization.

BACKGROUND ART

There is a vast amount of information in the world today that is available by computer. For example, on the World Wide Web alone there are millions of browsers and millions of web pages. In addition to the Internet, companies have set up local "intranets" for storing and accessing data for running their organizations. However, the sheer amount of available information is posing increasingly more difficult challenges to conventional approaches.

A major difficulty to overcome is that information relevant to a purpose of a user is often dispersed across the network at many sites. It is often time-consuming for a user to visit all these sites. One conventional approach is a search engine. A search engine is actually a set of programs accessible at a network site within a network, for example a local area network (LAN) at a company or the Internet and World Wide Web. One program, called a "robot" or "spider," pre-traverses a network in search of documents and builds large index files of keywords found in the documents.

A user of the search engine formulates a query comprising one or more keywords and submits the query to another program of the search engine. In response, the search engine inspects its own index files and displays a list of documents that match the search query, typically as hyperlinks. When a user activates one of the hyperlinks to see the information contained in the document, the user exits the site of the search engine and terminates the search process.

Search engines, however, have their drawbacks. For example, a search engine is oriented to discovering textual information only. In particular, they are not well-suited to indexing information contained in structured databases, e.g. relational databases. Moreover, mixing data from incompatible data sources is difficult in conventional search engines.

Often a user may wish to collect different kinds of information together. For example, a hospital administrative staff worker may need to search one database to find out what kind of health insurance a patient has, another database to find out which doctor is treating the patient, and a third database to find out which services have been performed. Often, the hospital administrative staff worker will be making the same kinds of time-consuming queries daily, but for different patients.

Another disadvantage with conventional search engines is that irrelevant information is aggregated with relevant information. For example, it is not uncommon for a search engine on the World Wide Web to locate hundreds of thousands of documents in response to a single query. Many of those documents are found because they coincidentally include the same keyword in the search query. Sifting through search results in the thousands, however, is a daunting task.

As another example, a personnel administrator might be interested an employee's choice of health plan, but an MIS administrator would be more interested in which computer the employee is using. Therefore, the user has to sort out which documents and databases are relevant and which are irrelevant for a particular goal.

By pre-traversing a network to index documents, a conventional search engine suffers from obsolescence of data in its search indexes. Documents are constantly being updated, but it may take months for the new information to filter down to search engines.

When a user activates a hyperlink on a page of search results, the user leaves the search site and terminates the search. Users who are browsing for more information must return back to the search site. Another effect of leaving the search site is that sponsors of the search site, e.g. paid advertisers, have minimal interaction with users of the search site.

DISCLOSURE OF THE INVENTION

There exists a need for a mechanism to collect relevant information located at a plurality of sites and stored in plurality of incompatible formats according to configurable search strategies. There is also a need for filtering out irrelevant information, avoiding obsolete information, and automatically classifying query results. Furthermore, a need exists for integrating browsing with searching so that a user does not have to leave a search site when looking for information.

These and other needs are met by the present invention, which dynamically gathers information from a diversity of data sources with agents, organizes the information in an configurable, information model, and visualizes the information according to a paradigm.

According to one aspect of the invention, a method of information discovery includes the step of accessing a description of a body of data, e.g. a class description of an object in an information model. In response to receiving an input, such as a browsing command or a name, from a user that identifies the body of data, information is gathered from a plurality of data sources based on the description and the input and structured according to the description. At least some of the body of data is output. By gathering information in response to user input, search strategies can be automated and obsolescence of the information can be reduced. By structuring information according to a description, relevant information can be collected together.

According to another aspect of the invention, a method of visualizing information comprises the step of accessing a description of a body of data and a plurality of descriptions of visual representations for the body of data. Information is gathered for the body of data from a plurality of data sources based on the description of the body of data. At least some of the body of data is output based one of the descriptions of visual representations for body of the data, indicated by input received from a user. By outputting to the user some of the data according to a selected visual representation, irrelevant information can be filtered out.

According to other aspects of the invention, sequences of instructions are embodied in a computer readable medium, such as a computer memory, disk, or carrier wave, for causing a computer to discover and visualize information.

Additional objects, advantages, and novel features of the present invention will be set forth in part in the detailed description which follows, and in part will be come apparent upon examination or may be learned by practice of the invention. The objects and advantages of the invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for information discovery and visualization are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
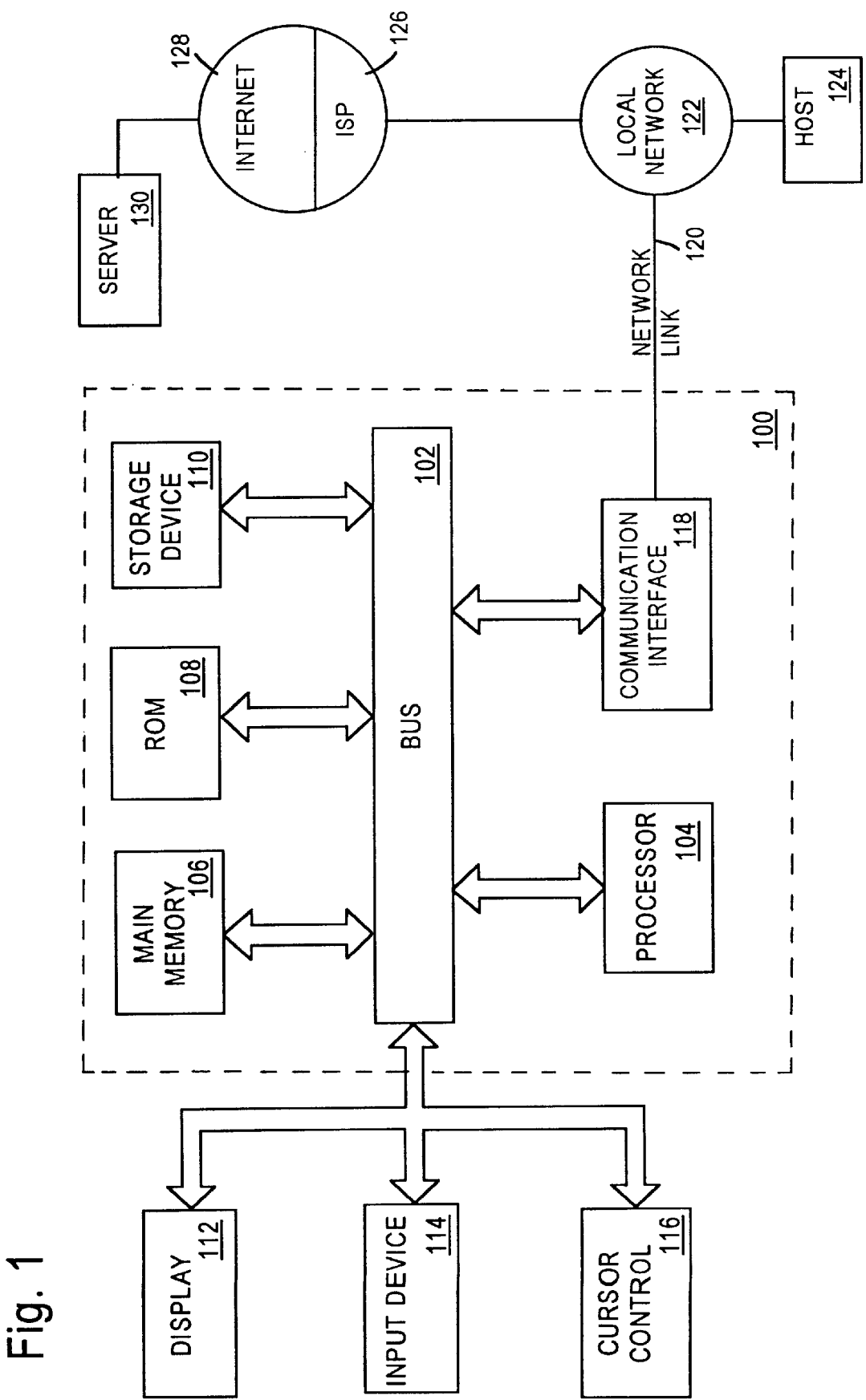
FIG. 1 is a high-level block diagram of a computer system with which the present invention can be implemented.

FIG. 1 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of computer system 100 to discover and visualize information according to a configurable information model. According to one embodiment of the invention, information discovery and visualization is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

Network Overview

Figure 2:
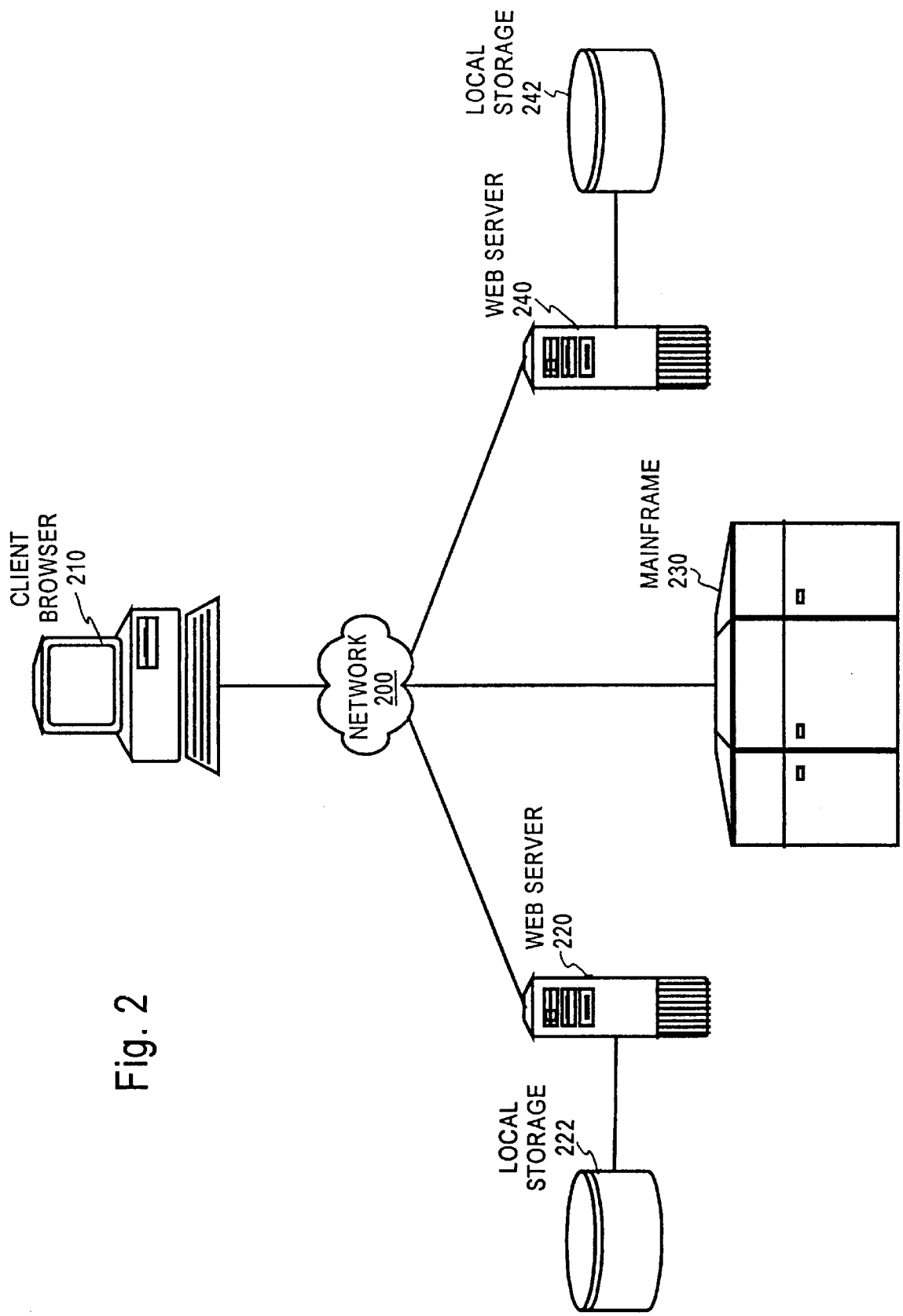
FIG. 2 is a diagram of a network in which the present invention can be implemented.

Referring to FIG. 2, depicted is a network 200 within which the present invention may be implemented. A web server 220 according to one embodiment of the present invention gathers information dynamically from one or more data sources, which may be located at different servers and have incompatible formats, structures the information into an object-oriented, information model, and outputs the information for the user according to an associated visual representation. The information model and the visual representation are defined by human operators according to their own needs, purposes, and preferences as part of the configuration of the server. Multiple information models and visual representations may be defined for any server.

A user may access the web server 220 by executing a web browser at client 210. Web browsers are well-known in the art, and are readily available from such corporations as Netscape™ Communications Corp. and Microsoft™ Corp. In order to access the web server 220, the user at client browser 210 activates a hyperlink having a URL (Uniform Resource Locator) of the following form:

TABLE 1 http://www.server.com/query.pl?Class=Seed&
View=Paradigm

In the exemplary URL, the network address of the web server 220 is specified as "www.server.com" and the portion of the URL after the question mark (?) hold user specified parameters. The Class and Seed parameters, as explained in more detail hereinafter, indicate an object about which a user intends to discover information. The object is visualized according a paradigm specified by the Paradigm parameter, also explained in more detail hereinafter.

When the hyperlink is activated, the web server 220 receives a request to initiate an information discovery session, specified by parameters embedded in the URL. In response, the web server 220 gathers information from one or more data sources. The data sources can have incompatible formats, e.g. web page, relational database, spreadsheet, text file, etc. The data sources can be stored at a plurality of sites, for example, locally with respect to the web server 220, such as a hard disk at local storage 222, or externally at another site in the network, e.g. at mainframe 230. In fact, the data source can even be another, remote information discovery web server 240.

A Framework for Information Discovery, Modeling, and Visualization

Figure 3:
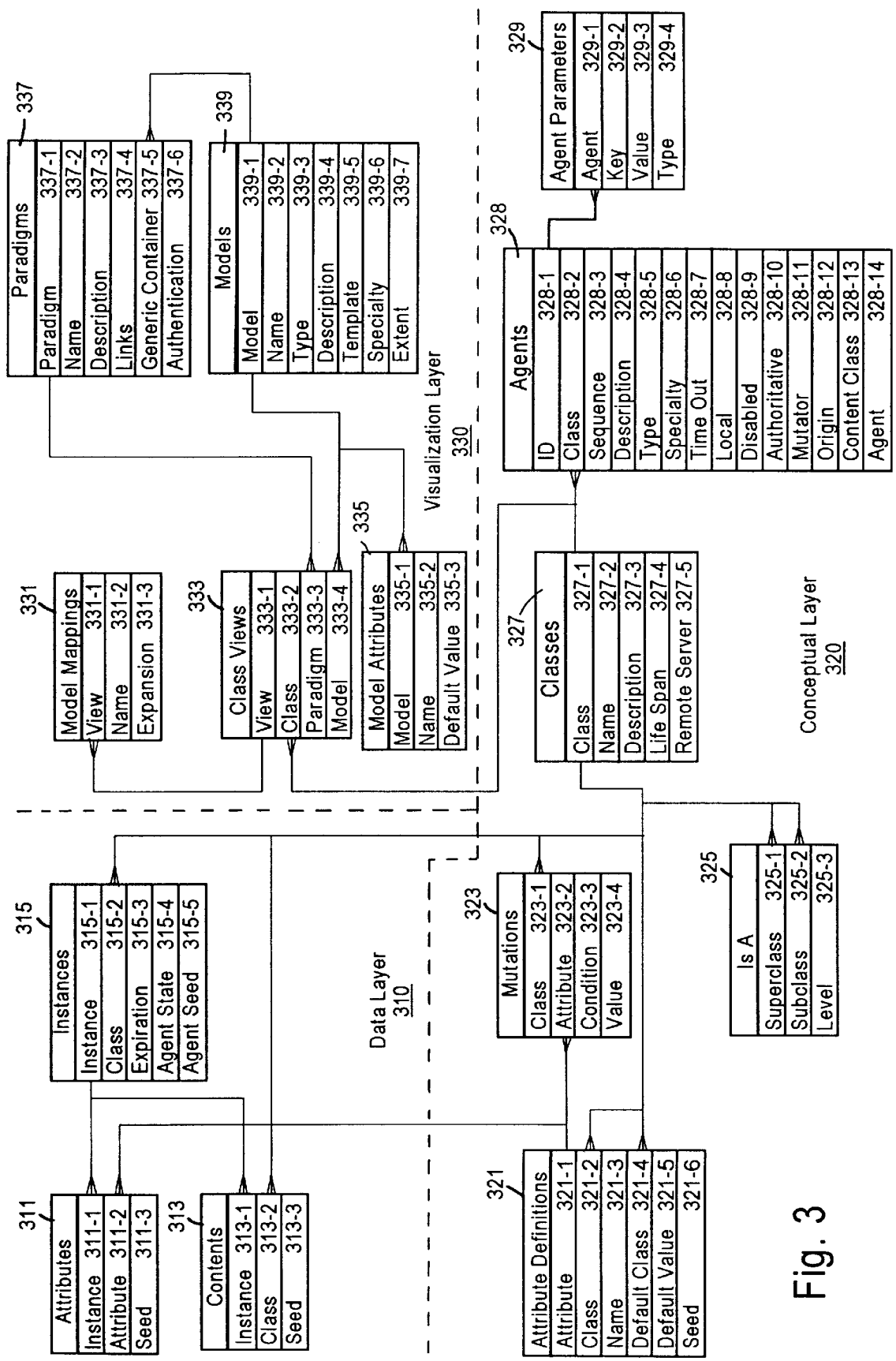
FIG. 3 is a diagram of data structures employed by an embodiment of the invention.

Each web server implementation of the present invention includes a framework for information discovery, modeling, and visualization. Referring to FIG. 3, depicted is a data structure of a general-purpose information modeling and visualization framework 300 for defining and configuring the information models and visual representations stored at a server. Many-to-one relationships between data fields in the data structure are indicated by an interconnecting line with an inverted "V" on the many side. For example, instances 315 may have many attributes 311. Accordingly, there is an inverted "V" on the "many" side of the "Instance" field 311-1 and no inverted "V" on the "one" side of the "Instance" field 315-1.

Framework 300 is a way of generically organizing information about specific information models. Accordingly, data structures for framework 300 define a set of data types, describing how classes of the information model are defined, how objects in the information model are instantiated, and how objects are displayed.

According to one embodiment, the data structures for framework 300 are implemented within a relational database. Each data type in the framework 300 corresponds to a table in the relational database, each instance of a data type is stored as a row or "entry" in a table corresponding to the type, and the fields of each data type correspond to columns in the corresponding table. Persons of skill in the art would readily recognize that the framework 300 may be implemented in a variety of ways other than with a relational database, for example, by a collection of persistent objects defined with an object-oriented language such as C++, Smalltalk, and Java, or files of records or structures of a procedural language such as C, Pascal, Ada, BASIC, FORTRAN, COBOL, PL/I, and the like.

Closely related data types defined by framework 300 are grouped in three related layers: a data layer 310, a conceptual layer 320, and a visualization layer 330. The conceptual layer 320 acts as an intermediary between the data layer 310 and the visualization layer 330 and comprises data types that describe how information is organized within a defined information model.

Conceptual Layer

The main data type in the conceptual layer 320 is the "Classes" data type 327. A object of the "Classes" data type 327 includes a "Class" attribute 327-1, which is a unique identifier, e.g. a serial number or a memory address, for pointing to or referencing a class object. A "Classes" 327 object also includes a "Name" field 327-2, which is another unique identifier but in a format convenient for human use, e.g. a string containing the name of the class, e.g. "person" or "employee." The "Description" field 327-3 is a string for storing an annotation for an operator maintaining and debugging the configuration of the server.

The "Life Span" field 327-4 specifies at most how long an instance of the class will last. There are three life spans: permanent, mortal, and instant. A permanent instance of a class will remain in the database until explicitly and manually removed. A mortal instance will be removed automatically after it expires. An instant instance is only available for the query that found it. An instance may be removed from the data layer 310 before expiration of its life span for space management reasons. For example, if the database reaches an overflow condition or fills up, a number of instances, e.g. the least recently used instances, would be removed to create space.

The "Remote Server" field 327-5, if non-empty, holds a URL of a server that defines this class. In this manner, a local server can link to another, remote server for defining, gathering information, and caching instances of the remote class. For example, a bank server that models bank-related information may model car loans. A "car loan" object may have an attribute that is a "car" object, describing the car for which the loan was made. The "car" object itself, however, may be defined at another server. The other server or "remote server" is accordingly responsible for gathering and structuring information about cars. Thus, the remote server feature allows a local server to link to a remote server for modeling, while keeping the area of expertise of the separate servers as uncoupled as possible. As explained in more detail hereinafter, remote class instances may be visualized with a hyperlink.

Objects of a class may have any number of attributes, which are defined by the "Attribute Definition" data type 321. For example, a person may have a name, e.g. "Denis." Accordingly, the name attribute for the person class would have an entry in the "Attribute Definition" table 321. In this example, the "Attribute" field 321-1 contains a unique identifier for the attribute. The identifier for the class that the attribute belongs to is contained in the "Class" field 321-4. The "Attribute" table 321 also includes a field for a human-readable "Name" 321-3. Each attribute may have a default class 321-5 and a default value 321-6 to be used when information about attribute has not yet been gathered.

Certain attributes may be a "seed" if the "Seed" field 321-6, containing a boolean or yes/no value, is true or yes. A seed attribute is a value that identifies an object, allowing the server to find and gather information about the object. For example, a person's name or social security number (SSN) may be a seed attribute. A class may specify one or a plurality of seed attributes.

Entries in the "Mutations" 323 table specify patterns by which the server recognizes that an instance of one class should be considered to be an instance of an immediate subclass. For example, a "person" object having a "gender" attribute may change to an object of the "male" class (indicated by the "Class" field 323-1) when the "gender" attribute (indicated by "Attribute" field 323-2) attains a value equal (indicated in "Conditions" field 323-3) to "male" (indicated by "Value" field 323-4). Other values of "Conditions" field 232-3 include "greater than or equal to" (>=) and "less than or equal to" (<=).

The "Is A" table 325 is used to support simple and multiple inheritance, which allows the configurable information model to be object-oriented. An operator may wish to declare that a "employee" class inherits from, i.e. is a subclass of, a "person" class. Accordingly, an entry in the table for the "Is A" data type 325 would have a "Superclass" field 325-1 that identifies the "person" class and a "Subclass" field 325-2 that identifies the "employee" class. A subclass inherits the attributes of its superclass and may add additional attributes. For example, an "person" object may have a "name" attribute. In this case, an "employee" object also has a name attribute, but may add an attribute for an SSN.

The "Level" field 325-3 indicates a transitivity level of superclass/subclass link. Level 1 indicates a direct relationship (parent/child). A level 2 link indicates a relationship through a level 1 link, e.g. a grandparent/grandchild relationship. All superclasses, direct and indirect, are stored as entries for a given subclass. Mutators are used to specialize an object, that is change the class of an object into a subclass.

Each class has a list of agents, located in separate entries in the "Agents" table 328. Entries in the "Agents" table 328 include an "ID" field 328-1 for providing a unique, machine-readable identifier, e.g. a serial number or an address in virtual memory. A human-readable description of the agent, e.g. a string, is stored in the "Description" field 328-4 for aiding in the development and maintenance of agents by administrators.

An agent is program, written in Perl for example, or any other set of interpreted or machine executable instructions that is responsible for querying an external data source (e.g. a database, a web-site) and storing the results for an instance of the class, specified in the "Class" field 328-2. As explained in more detail hereinafter, agents are invoked on demand, for example automatically during the process of "resolving" an instance based on its class and seed or triggered upon a user request (e.g., pressing a "reload" button on a browser).

The "Sequence" field 328-4 contains a number that defines a sequential order of invocation of the agents for a class. For example, agents with a lower sequence number are invoked before agents with a higher sequence number. Generally, agents are ordered using the transitivity level, specified in the "Level" field 325-3. Agents defined in the current class are fired first, followed by those of the parents (level 1), then those of the grandparents (level 2), and so on. The sequence number is used to fine-tune departures from this default ordering.

The "Type" field 328-5 specifies one of two types of agents: attribute and content. An attribute agent is responsible for gathering information about an object, e.g. getting the author of a document, the size of the document, etc. Attribute agents are normally invoked when resolving an instance, which takes place the first time the value of an attribute is requested.

Content agents, on the other hand, are responsible for gathering the content of an object, for example, the files in a directory, graphics and paragraphs from a web page, names in a phone book, etc. A class or superclass of all the content objects to be found by an agent is specified in the "Content Class" field 328-13. Content agents are invoked whenever the content of an object is first accessed, usually when producing a visualization of a space of the object, as described in more detail hereinafter.

Efficiency in the implementation of the present invention may be enhanced by specializing agents for specific data sources. Accordingly, the "Specialty" field 328-6 specifies the nature of a data source the agent queries. For example, the "Specialty" field 328-6 may indicate "ODBC" for relational databases. In this case, the specialized database agent is programmed to submit an SQL query to a relational database based on parameters specified in the "Agent Parameters" table 329 and convert the SQL query results into a proper format for attributes of an object.

Other specialties include "Web" for web pages, "CORBA" for object request brokers, and "Telnet" for information available on-line through the "telnet" interface, e.g. negotiating an interactive session with a remote system over a (virtual) terminal. The actual name of the specialized data source is stored in the "Origin" field 328-12. The "Perl" specialty is a generic mechanism for retrieving information from other data source formats, by executing Perl instructions.

The "Time Out" field 328-7 indicates how long an agent should wait before deciding that a data source is unavailable. This feature is useful in handling network outages.

Agents of a superclass are normally invoked for its subclasses, unless the value in the "Local" field 328-8 specifies otherwise. A local agent is not invoked by subclasses or any other class. Local agents are useful in conjunction with mutating objects when an agent of the source class for the object no longer makes sense for destination class of the object. For example, a "file" object may include an agent for determining a type (e.g. graphic, text) of a file. If the type of the file is a graphic, then a mutation (defined in "Mutations" table 323) may cause the class of the file object to become a "graphic" object. However, a graphic object does not need an agent to determine its file type, because its file type, graphic, must be known. By declaring the agent to determine the file type of a file object to be a local agent, this agent does not need to be invoked for objects of subclasses that already know their types.

For debugging and diagnostic purposes, an administrator may temporarily disable an agent from firing by placing a "yes" value in the "Disabled" field 328-9. The "Authoritative" field 328-10 contains a "yes" or "no" value identifying how to respond when an agent is not able to find requested information. If an authoritative agent is not able to find the requested information, then that condition indicates that no other agent would be able to find the information. This feature reduces the number of unnecessary agent invocations.

The "Mutator" field 328-11 specifies whether an agent can be used by a parent class to test for mutation to the class specified in the "Class" field 328-2. For example, an object of a "Company" class may use a "Get Ticker Tape" agent of a "Public Company" subclass if the "Mutator" field 328-11 is "yes." If the "Get Ticker Tape" agent returns a success code, then the "Company" object would mutate to be a "Public Company" object.

The "Agent" field 328-14 contains instructions, or alternatively a name of a program comprising instructions, to be executed when invoking the agent. The instructions may comprise interpreted instructions, e.g. a Perl script or shell script, SQL statements, machine executable instructions, e.g. a compiled C program, or both.

When an agent is invoked, it is passed parameters specified in entries of "Agent Parameters" table 329. The "Agent" field 329-1 of an entry contains an identifier of the agent to which an agent parameter belongs. The "Key" field 329-2, the "Value" field 329-3, the "Type" field 329-4 are specific to each agent specialty, but generally denote the name, value, and data type, respectively, of each agent parameter. In an example of a web agent, the "Key" field 329-2 contains the name of a variable to match, the "Type" field 329-4 contains where to look (e.g. text, HTML, or links), and the "Value" field 329-3 contains a regular expression of a recognition pattern. Multiple agent parameters for a single agent are supported by multiple entries in the "Agent Parameter" table 329 with the same value in the "Agent" field 329-1.

Data Layer

The data layer 310 acts as the server's memory. Any results of invoking a class agent is stored in the data layer 310. Although the main purpose of the data layer 310 is to reduce network traffic and dependencies on the reliability of external data sources, the data layer 310 may also be used to store users' annotations and other relevant manual additions to the data discovered by class agents.

An instance is a body of data that is a concrete example of a description provided by a class. In this framework 300, all instances may contain any number of other instances of any class. Each instance has a corresponding entry in the "Instances" table 315. The "Instance" field 315-1 is a unique identifier, e.g. a serial number or memory address, for the instance. The class of the instance is specified by an identifier in the "Class" field 315-2. If an object is an instance of a mortal class, the "Expiration" field 315-3 contains an expiration date directed from the life span of the class and the creation time of the instance.

Cached instances remember the state of their agent resolution. An instance may be cached when only some of its agents have been invoked, for example, when a user directs the web server to visualize another instance, suspending the invocation of class agents for the instance. Accordingly, returning back to the instance resumes invoking the agents at the state which the agent invocation was suspended. Therefore, the "Agent Seed" field 315-4 contains the seed that agents were invoked with, and the "Agent State" 315-5 contains information indication which agents were invoked, e.g. agent numbers (cf. "ID" field 328-1).

Each instance contains a value for each attribute defined in its class and superclass definition. Specifically, entries for attribute values are stored in the "Attributes" table 311. The "Instance" field 321-1 of an entry identifies which instance contains the value in the "Seed" field 311-3 for an attribute specified in the "Attribute" field 311-2.

Each instance may contain other instances of any class by storing corresponding entries in the "Contents" table 313. The "Contents" table 313 includes an "Instance" field 313-1 for identifying the containing instance. The "Contents" table 313 also includes a class identifier in the "Class" field 313-2, and a value identifying the instance in the 313-3. In general, the combination of a class and a seed is sufficient to identify and resolve any particular instance in the information model.

Visualization Layer

The visualization layer 330 contains knowledge describing how to visually represent an instance of class. The visual representation is language independent, i.e., it may be Hypertext Markup Language (HTML), Virtual Reality Modeling Language (VRML), or plain text.

A "paradigm" is a named group of visualizations of classes in a way that makes sense in a given context. For example, an "Internet" paradigm may provide a view of the world where IP (internet protocol) addresses, networks, and ISPs are important. As another example, a "Corporate" paradigm may present a coherent view of departments, employees, and so forth.

Each paradigm has an entry in the "Paradigms" table 337. The "Paradigm" field 337-1 holds a unique identifier, e.g. a serial number or a memory address, for each paradigm. The "Name" field 337-2 and the "Description" field 337-3 are human-readable fields for identifying and describing, respectively, each paradigm to aid in configuration and debugging. The "Links" field 337-4 specifies a template for expanding links, for browsing, in a paradigm.

The "Generic Container" field 337-5 specifies a space model for visualizing an anonymous collection of objects, which occurs when a query returns more than one result. For example, a user may query for a person named "Bob," and the web server may, in response, find more than one "Bob" in its data sources. Each instance of "Bob" is placed in a generic container and visualized according to the space model specified in the "Generic Container" field 337-5.

The "Authentication" field 337-6 specifies an authentication realm that identifies a group of user who have permission to use a resource, e.g. a paradigm. For example, a value of "managers" in the "Authentication" field 337-6 may signify that only users of a predefined "managers" group who enter a correct user name and password may use an associated paradigm. Authentication realms and their users are defined at the web server. In the example, a web server for a book store may provide two paradigms. A first "Customer" paradigm is for (potential) customer, does not require authentication, and allows any user to investigate which books are in stock. A second "Employee" paradigm, on the other hand, requires authentication, specifying the "managers" realm, because it displays more sensitive information, such a book store's employee's home telephone number, for managers.

Instances of a class may be represented differently in different paradigms and need not have a representation in every paradigm. However, there is only one representation of a class per paradigm. Accordingly, the "Class Views" data type 333 provides a mechanism to associate a class with a paradigm. Specifically, the "Class" field 333-2 and the "Paradigm" field 333-3 are used to identify a class-paradigm association. The visualization of the class-paradigm combination is controlled by a model, specified by the "Model" field 333-4 in conjunction with model mappings, which reference the class view according to the identifier, e.g. a serial number, stored in the "View" field 333-1. As explained in more detail hereinafter, by separating the visual representation into a model and model mappings, a visualization model for one class may be reused for another class, because the class-specific information, e.g. attribute names, are encapsulated in the model mappings.

A model is a generic, parameterized representation, used in conjunction with an underlying instance of the associated class. Model entries stored in the "Models" table 339, which includes a "Model" field 339-1 to identify each model and a "Name" field 339-2 and a "Description" field 339-4 for providing a human-readable identifier and description, respectively.

A "Template" field 339-5 specifies executable instructions or input for executable instructions to produce a formatted representation based on "model attributes" as parameters. According to one embodiment, the template is implemented as a Perl script, however, persons of skill in the art would readily recognize that the template may be implemented in other computer languages, whether interpreted or compiled. As explained in more detail hereinafter, templates include slots for expanding variables according to cached attribute values.

The "Specialty" field 339-6 indicates what kind of visualization is performed by a model, for example, hypertext and virtual reality modeling. If the "Specialty" field 339-6 indicate virtual reality modeling, then the "Extent" field 339-7 indicates an x-y-z dimension of an object or space in the three dimensional visualization model.

The "Type" field 339-3 indicates whether the model is a "space" or an "object." If a space model represents a virtual location in the paradigm, for example, a place where users can bookmark with their browser for later return. A space is used to enclose items that are contained in the underlying instance that also can be represented in the associated paradigm. Some examples of a space include a 3D room (in a virtual reality modeling specialty) and a web page (in a hypertext specialty) Both the attributes and the contents of the underlying instance (ultimately stored at "Attributes" table 311 and "Contents" table 313, respectively) are used to render a space in a visualization.

An object model type indicates an atomic representation that only uses named attributes of the underlying instance. In other words, an object model type does not use the contents associated with the underlying instance. A visualization of an object model type always appears in a space.

A model interfaces with its underlying instance through model attributes and model mappings. Model attributes, stored in "Model Attributes" table 335, include a "Model" field 335-1 for identifying the related model, a "Name" field 335-2 for identifying the model attribute, and a "Default Value" 335-3 for specifying a value for a model attribute when the underlying instance does not.

Model attributes are mapped to class attributes through the "Model Mappings" 331 data type. Since model attributes have a default value 335-3, it is not necessary to provide a complete mapping. An entry in the "Model Mappings" 331 table has a "view" field 331-1 to indicate which class view the model mapping is associated with. The "Name" field 331-2 contains the name of the model attribute that is being mapped in the entry.

The "Expansion" field 331-3 specifies a template for visualizing attributes. The template in the "Expansion" field 331-3 is expanded in the same manner as templates in the "Template" field 339-5 of the "Models" table 339 for the current model. For example, the expansion template may include slot for variable expansion as described in more detail hereinafter. Thus, the "Expansion" field 331-3 may be used for pre-expanding model attributes, e.g., for concatenating a class attribute with another value such as a constant string or another class attribute. The "Expansion" field 331-3 may also be used to specify an instance attribute name mapped to the model attribute.

Paradigm-Based Visualization

One aspect of invention relates to a mechanism for providing multiple visualizations of the same object based on a user selected paradigm. As explained hereinbefore, a paradigm is a group of related visualizations of classes. Different paradigms can provide different visualizations for the same object.

For example, an "employee" object may be visualized in association with information about salary, health benefits, and a retirement plan in a "Personnel" paradigm, but the same employee object may be visualized in association with information about the employee's e-mail address, computer model, and word processor type in an "MIS" paradigm. Thus, human resources administrators and MIS administrators would only see the information that is relevant for their tasks, because they interact with the system through different paradigms, designed for their tasks.

A user initiates a session with the server by specifying the name of a class, a seed, and the name of a paradigm. For example, a personnel director may wish to look up information about an employee having an SSN of 999-99-9999. In this case, the personnel director would input a class name "Employee," a seed "999-99-9999," and a paradigm name "Personnel." According to one embodiment, a browser that the personnel director is using may display a form collecting that information and submit to a server (e.g. at www.server.com) a query having a URL similar to:

TABLE 2 http://www.server.com/query.pl?Employee=999-99-9999&View=Personnel

Figure 4:
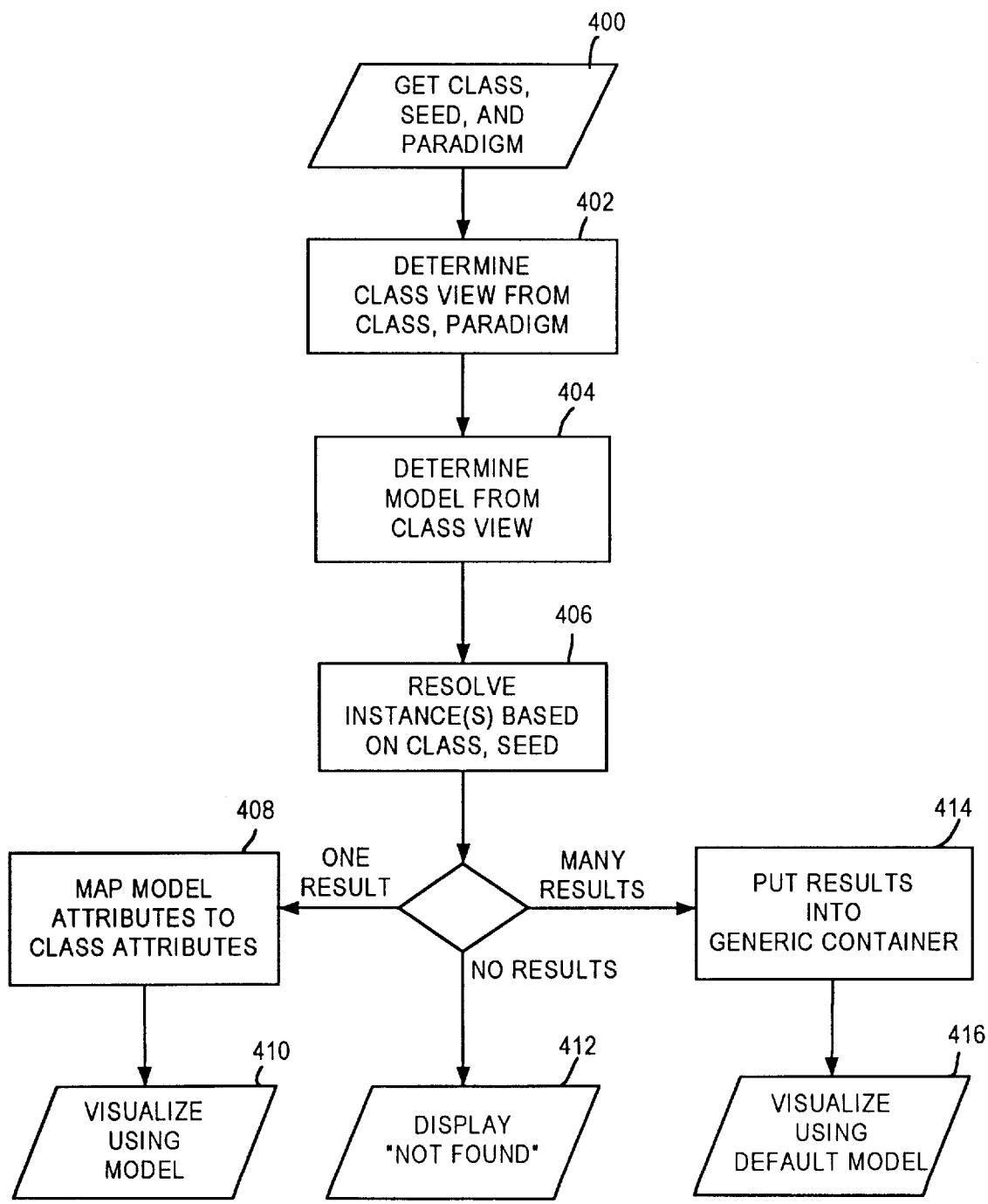
FIG. 4 is a flowchart illustrating the operation of an embodiment.

Referring to the flowchart of FIG. 4, in step 400 the server receives a query containing a name of a class (e.g. "Employee"), a seed for the class (e.g. "999-99-9999), and a name for a paradigm (e.g. "Personnel").

At step 402 the server determines a class view based on the class name and the paradigm name that have been input. In particular, the server scans the "Classes" table 327 to find an entry with the input class name (e.g. "Employee") in the "Name" field 327-2 to determine the class identifier in the "Class" field 327-1. Likewise, the server scans the "Paradigms, table 337 to find an entry with the input paradigm name (e.g. "Personnel") in the "Name" field 337-2 to determine the paradigm identifier in the "Paradigm" field 337-1. Thereupon the "Class Views" table 333 is scanned for an entry of a class view in which the "Class" field 333-2 contains the class identifier and the "Paradigm" field 333-3 contains the paradigm identifier.

The entry for the identified class view contains an identifier for a visualization model in the "Model" field 333-4. This identifier is used to fetch an entry from the "Models" table 339 (step 404), in which the "Type" field 339-3 is inspected to see if the model is a space. If the model is indeed a space, then one or more underlying instances for the model are resolved (step 406) from the input class name and the input seed, as described in more detail hereinafter.

If instance resolution does not result in the instantiation of any instance, i.e. no results, then a message indicating this situation, e.g. "not found" is output to the user (step 412). If instance resolution results in the instantiation of a plurality of instances, for example, when the seed value is not unique, then the results are placed in a generic container (step 414). In this situation, the model specified by a model identifier in the "Generic Container" field 337-5 of the paradigm (step 414) is used for visualization in place of the model of an individual instance (step 416).

In step 406, when instance resolution results in one object, the model attributes are mapped to attributes of the class of the underlying instance via "Model Mappings" table 331 to determine the values of the model attributes. In particular, the model identifier, originally determined from the "Model" field 333-4 of the class view entry in the "Class Views" table 333 is used to fetch entries in the "Model Attributes" table 335. The name of each model attribute, derived from the "Name" field 335-2, and a class view identifier from the "View" field 333-1 is used to fetch a model mapping entry in the "Model Mappings" table 331. If no such entry is found in the "Model Mappings" table 331, then the value in the "Default Value" field 335-3 is used.

On the other hand, if there is an entry in the "Model Mappings" table 331 for the model attribute and the class view, then the string expansion specified in the "Expansion" field 331-5 is performed. More specifically, the expansion generally results in a string containing the name of an instance attribute. The instance attribute name is used for fetching the attribute value of the instance from the "Attributes" table 311 in the data layer 310, in conjunction with the instance identifier of the underlying instance.

If the result of the expansion includes an object having a spatial visualization, then the value is expanded as a link by means of the "Links" field 339-4 of the entry for the current paradigm in the "Paradigms" table 339. In particular, the URL of the resulting link is of the form specified in TABLE 1.

Determining the class of the attribute value involves examining the "Type" field 337-3 for the model of the value's class within the current paradigm in the "Class Views" 333 table. If the attribute value is an unresolved instance or a scalar, then the value in the "Seed" field 311-3 is used. Instances of remote classes, defined and stored at another server, are visualized as a link with a URL of the form shown in TABLE 1 specifying the network address of the remote server, stored in the "Remote Server" field 327-5. Activating that link allows the object stored at the remote server to be visualized.

In step 410, the underlying instance is visualized. Since the underlying instance has a space visualization, the server will iterate through the contents of the instance (i.e., by fetching entries from the "Contents" table 313) and collect any item belonging to a class that has an object visualization (cf. "Type" field 339-3) in the current paradigm. When the number of content items exceed a predefined threshold, hit analysis is performed of the contents for automatically classifying the contents according to various criteria and categories, as explained in more detail hereinafter.

Content items are handled by recursively mapping model attributes for the content items and expanding corresponding visualization templates, in the "Template" field of the model for the class of the content item for the current paradigm. The expanded templates are concatenated to a special "Contents" parameter of the space model.

When all the values of the model attributes and contents have been determined, the template for the model in the "Template" field 339-5 is expanded and sent to the client browser for rendering. A visualization template may specify, for example, hypertext markup (e.g. in HTML) or 3D markup (e.g. in VRML).

Visualization templates may include slots for variable expansion, for example in one embodiment, of the form "$x", "%x", and "@x", where "x" is a name of a variable. If there is not an attribute for the underlying instance with that same name, i.e. "x" in this example, or if the attribute with that name does not have a value, then the default value of the model attribute, from "Default Value" field 335-3 is used as a current value. On the other hand, if there is an attribute with the same name, i.e. "x" in this example, then a current value for the expansion is the value of the attribute with the same name.

If there is a model mapping with the same name, specified in the "Name" field 331-2 of the "Model Mappings" table 331 for the current view ("View" field 331-1), then the template in the "Expansion" field 331-3 is expanded recursively, using the current value. A "%x" slot is replaced by the current value as is. A "$x" expansion slot is replaced by the current value using the HTML character set encoding and models of a spatial value are expanded as a link in the current paradigm showing the current value. A "@x" expansion slot is replaced by the current value using a restricted character set encoding for URLs.

When an attribute is expanded as a link, the user may activate the link as a browsing command, causing the instance associated with the attribute to be visualized by re-executing steps 402 through 408. Activating links to a remote server cause the remote server to perform steps 402 through 408 for the remote object. In this manner, it is possible for the user to stay in information discovery mode, or search mode, throughout browsing, because accessing each link yields new visualizations of new objects by the server. Thus, the user never really leaves the web site of the server and continues to view the visualizations during the browsing process.

As a result, operators of an embodiment of the present invention that is configured to be a search engine on the World Wide Web can defray costs by more effectively presenting advertising material during the entire session with the user. In contrast, conventional search engines merely present a list of hyperlinks as their results, and activating one of the hyperlinks takes the user out of the search site terminating the information discovery session.

In the example, if instead the employee object was viewed in an "MIS" paradigm, then a different set of models for the employee object and attributes is determined through the "Class Views" table 333. By the class view mechanism, the same object can be visualized in different ways depending the paradigm being employed. Thus, paradigms may be tailored for outputting relevant information of an object for specific purposes, while not outputting irrelevant information (e.g., an employee's salary for an MIS director). Some paradigms may require user authentication (e.g. password protection) for implementing security and controlling access to information.

In addition, the use of paradigms to specify models with expandable templates allows a "virtual web" within a configurable information model to be presented to a user in various kinds of visualizations. For example, a space may be visualized in one paradigm as a standard web page, using templates written with hypertext markup, e.g. in HTML, HTML+, HTML 3.0, etc. As another example, the same space, but through another paradigm, may be visualized as three dimensional worlds, using templates written with virtual reality modeling, e.g. in VRML. In a 3D world, companies may be shown as buildings and employees as "avatars." In fact, the user can be enabled to switch from one paradigm to another, allowing to the user to decide and choose which representation is more effective for exploration.

Agent-Based Instance Resolution

Another aspect of the invention relates to dynamic data integration from a variety of data sources, for example, databases, files, documents, and web servers located at various site on a network. The data collection is performed on demand by users as their needs arise. The retrieved information may be cached in the data layer 310 for a period of time according to the server's configuration.

In one embodiment of the invention, dynamic data collection and integration are performed during resolution of an instance by invoking one or more agents. These agents, which comprise executable instructions, encapsulate knowledge about a particular data source, e.g. formatting information, relevant to a particular kind of object stored at the server. For example, an agent invoked for an instance of an "employee" class may query a relational database located at a company's headquarters. As another example, an agent responsible for collecting and integration about an instance of an "author" class may check a web-server for email addresses to discover a living author's email address. Other examples of data sources include web pages, search engines, text files, operating system files, SEC filings and reports, and the like.

Figure 5:
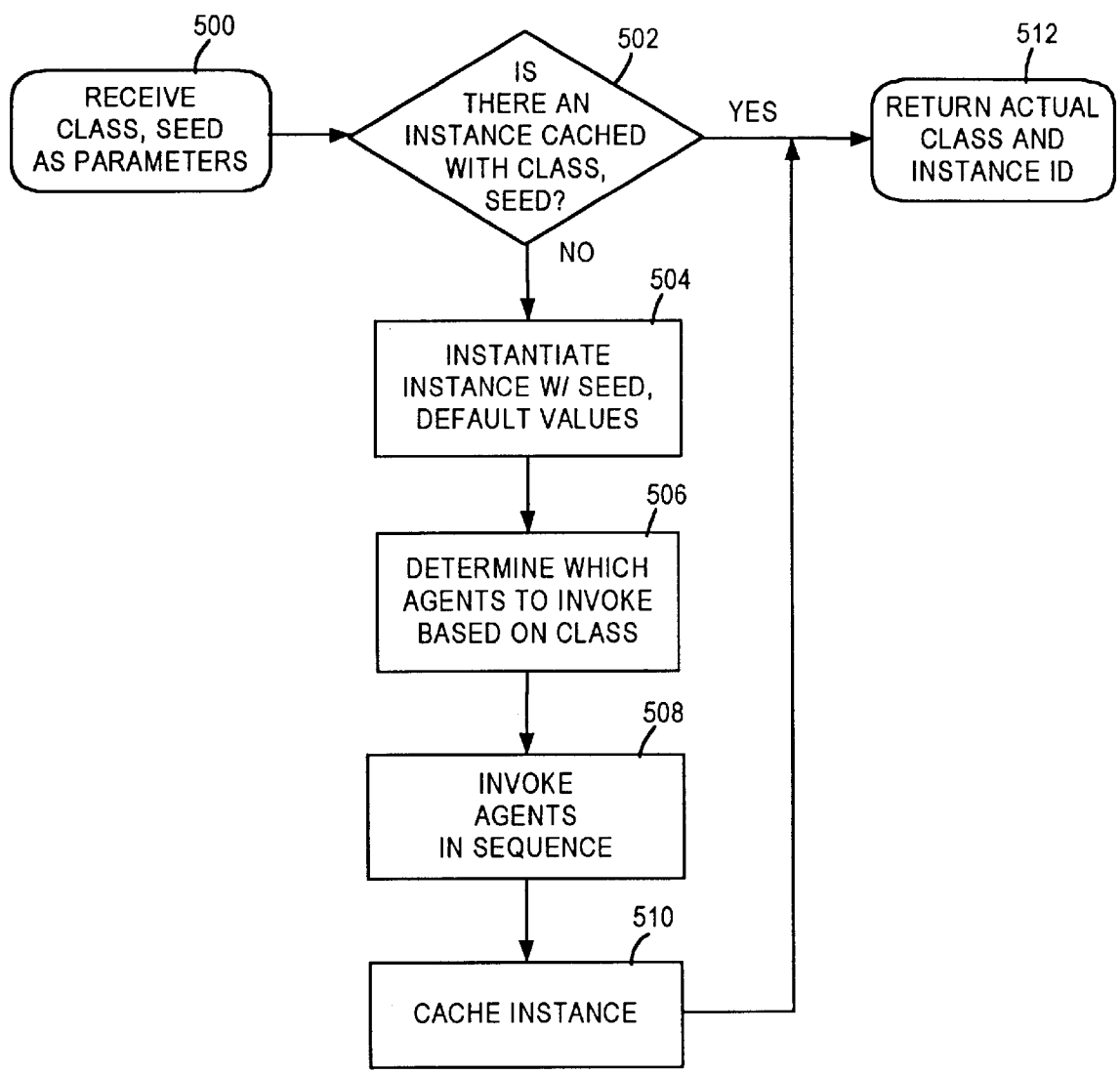
FIG. 5 is a flowchart illustrating the operation of resolving an instance with agents.

Referring to the flowchart in FIG. 5, instance resolution uses a class and a seed as parameters (step 500). The class parameter is an identifier which can be used for selecting a single entry from the "Classes" table 327, which describes a body of data, i.e. an instance of the class, having attributes and contents. A seed is a value for an attribute of the object that is used for gathering information about the object. For example, a good seed for an "employee" object is an employee number, such as a social security number, because it uniquely identifies the employee and is a commonly used index in many authoritative databases.

In step 502, the data layer, which stores instances of classes, is checked to see if an instance that is a member of the class or subclass that has an attribute marked 'seed' (e.g. in "Seed" field 321-6) with the value of the seed parameter. If such an instance is found, the instance identifier (stored in the "Instance" field 315-1) is returned in step 512. In addition, an identifier of the actual class of the instance (in the "Class" field 315-2) is also returned, because an instance with that seed value may be a member of a subclass, specified in the "Is A" table 325. For example, the server may be configured to discover information about "employee" objects. The corresponding "employee" class may have two subclasses, "exempt" and "nonexempt," for payroll purposes. When an "employee" instance is resolved, the actual class of the instance is one of the two subclass, "exempt" or "nonexempt."

On the other hand, if such an instance is not cached in the data layer 310, then the instance is instantiated in step 504 with attributes initialized from the seed parameter and the default values in the attribute description, e.g. in the 321-5 field. Instantiation results in the creation of a new entry in the "Instances" table 315 with a unique instance identifier being stored in the "Instance" field 315-1. In addition, the "Agent Seed" field 315-5 is initialized to the seed parameter and the "Agent State" field 315-4 is cleared.

In step 506, the agents to be invoked for gathering information for the new instance are determined. These agents may be agents specified for the class identified by the class parameter ("class agents") and non-local agents of superclasses of the class ("non-local superclass agents"). In one embodiment, agents are listed in respective entries of the "Agents" table 328. Class agents are determined from entries in which the class identifier in the "Class" field 328-2 matches the class parameter received in step 500. Non-local superclass agents are determined from entries in which the "Local" field 328-8 is false and the class identifier in the "Class" field 328-2 matches the class identifier specified in the "Superclass" field 325-1 of the "Is A" table 325 wherein the corresponding "Subclass" field 325-2 contains the class identifier matching the input class parameter.

As described in more detail hereinafter, the agents that have been determined to be invoked in step 506 are sorted by their level transitivity in the "Level" field 325-3 and by sequence number in the "Sequence" field 328-3 and successively invoked using the seed value (step 508). If successful, the instance is cached in the data layer 310 (step 510), setting the "Expiration" field 315-3, as appropriate. For example, the "Expiration" field 315-3 may contain the termination date of a mortal object (cf. the "Life Span" field 327-4). When a mortal object has expired, it is removed from the data layer 310. Finally, the instance identifier and the actual class, possibly changed due to a mutation, of the instance is returned in step 512.

Since agents are invoked when an instance is resolved, information that is potentially more up-to-date can be retrieved than through conventional search engines. Conventional search engines pre-traverse the web to build their index files, which may become out of date for months until the search index is re-updated. With the present invention, however, the "Life Span" attribute controls how long any information object is cached, reducing the obsolescence of information stored at the server to individually acceptable levels, e.g. caching for only a month.

Invoking Agents

Figure 6:
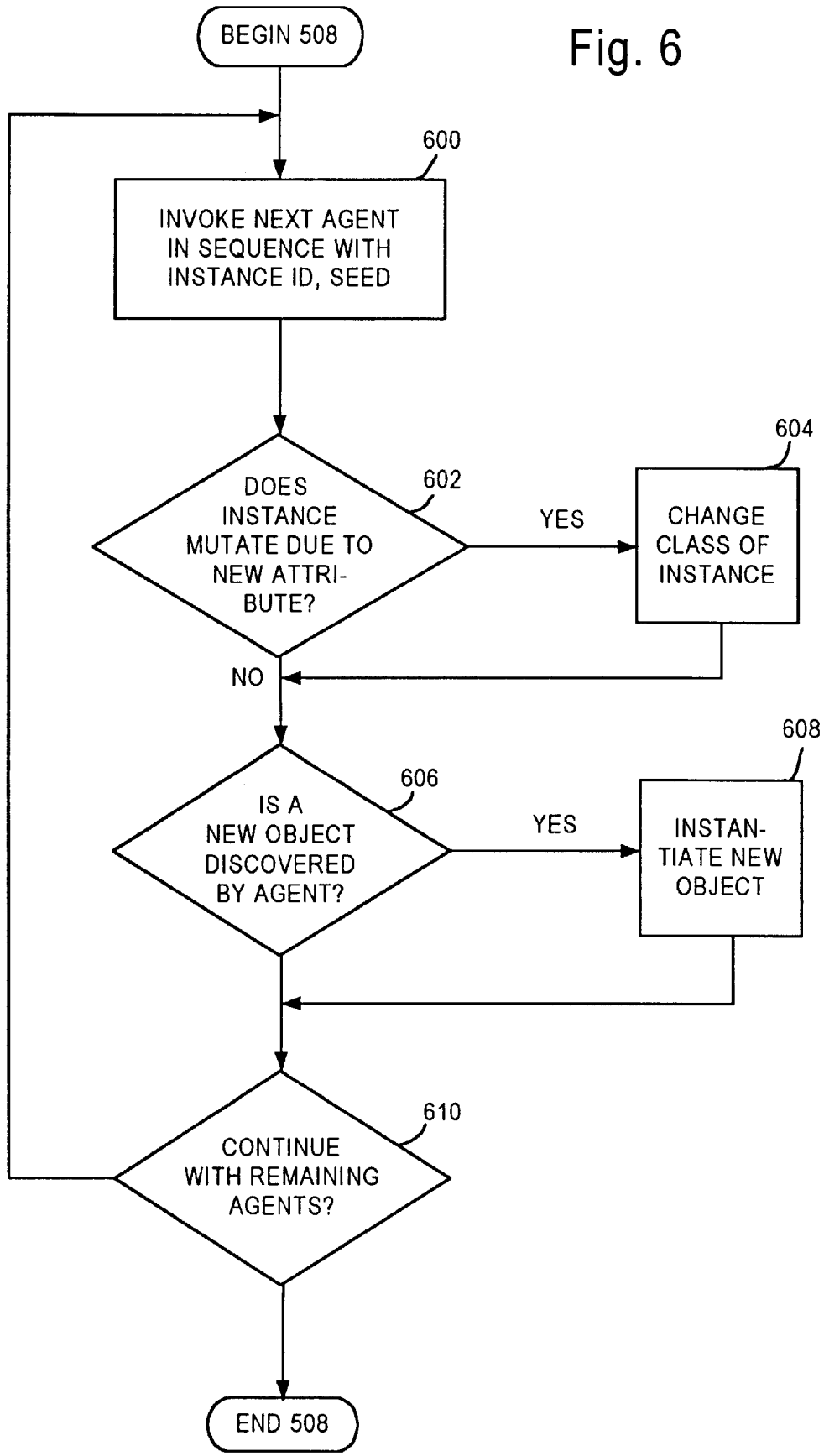
FIG. 6 is a flowchart illustrating the operation of invoking agents.

Referring to FIG. 6, agents are invoked successively in sequence based on the value in the "Level" field 325-3 of the "Is A" table 325 and the "Sequence" field 328-3 of the "Agents" table 328. In one embodiment, the agent with the lowest sequence number is invoked first (step 500), but persons of skill in the art would readily recognize that other orders, e.g. the highest sequence number first, may be implemented. The purpose of ordering agents according to a sequence number, assigned by a human designer, is to allow some agents to rely on values discovered by other agents. When an agent is invoked, it is passed an instance identifier for accessing and modifying attributes of the instance being resolved and the input seed value.

For example, if the instance is a member of a "employee" class and the seed value is an employee number, the agent is passed an identifier of the instance and the employee number. The agent may use the employee number to query an authoritative database (cf. the "Authoritative" field 328-10), parse the result to determine some values of attributes (such as length of employment), and initialize the attributes with the parsed values. As another example, a "directory"

object may use a pathname as a seed value. The contents, e.g. files and other directories, of a directory having that pathname may be inspected by the agent for creating file objects as contents of the directory object.

Generally, agents come in two flavors, attribute agents and content agents, specified in the "Type" field 328-5 of the "Agents" table 328. An attribute agent is responsible for gathering information about an instance itself, for example, getting the author of a document, the size of the document, and creation date. Attribute agents are normally invoked during instance resolution, which takes place the first time the value of an attribute is requested. In the example, the agent that discovered the length of employment for an employee from an authoritative database is an attribute agent.

Content agents are responsible for gathering the content of the object, for example, getting files in a directory, graphics from a web page, or names from a telephone book. Content agents are invoked whenever content of the object is first accessed, usually when producing a visualization for the object's space. In the example, the agent that discovered files in a directory is a content agent.

Sometimes, information discovered for an object, typically by an attribute agent, causes the object to change its class. For example, an agent for an "employee" object may discover information that the employee is an exempt employee placed, e.g., in an "exempt" attribute of the "employee" object. At step 602, entries in the "Mutations" table 323 are checked to determine whether an attribute has a value that matches a specified condition. In the example, a "Mutations" table 323 entry may contain the attribute identifier in the "Attribute" field 323-2 that matches the attribute identifier of the "exempt" attribute, stored in the "Attribute" field 321-1 of the "Attribute Definitions" table 321.

If the content of the "Value" field 323-4 and the new value, e.g. "true," meet a condition specified in the "Condition" field 323-3, e.g. equality, then the object is reformatted (in step 604) to conform to the class specified in the "Class" field 323-1. In the example, there may be two entries in the Mutation table 323 for the "exempt" attribute, one with a value in "Value" field 323-4 of "true" specifying the "exempt" class and another with a value of "false" specifying the "non-exempt" class.

Another way to determine whether to mutate an object is by executing a mutator agent, identified by a "yes" value in the "Mutator" field 328-1 of subclass agents of the object. Since agents can be written in a procedural language such as Perl, this mechanism affords greater power and flexibility than the "Mutations" table 323. Therefore, by either mechanism, objects can change their class to an immediate subclass; successive mutations allow an object to mutate to more remote subclasses.

Sometimes, the information discovered for an object, typically by a content agent, causes a new object to be instantiated. For example, a content agent for a "directory" object may discover information that a directory contain three files. If an agent discovers information that would appropriate as a seed value for a new object (step 606), then the agent will cause the new object to be instantiated and initialized with the discovered information (step 608). Agents for the new object are automatically invoked when the attributes and contents of the new object are requested, e.g. during visualization.

Sometimes different agents invoked for resolving an instance may return inconsistent information about attributes of the instances. This situation may occur if the data sources are inconsistent or if the seed value does not uniquely specify an object, for example, searching for an employee named "Bob" when "Bob Smith" and "Bob Jones" are employed. There are a variety of approaches to address this situation.

One set of approaches would be to only allow one instance to be resolved. Accordingly, the inconsistent attribute information is ignored, e.g. by using only the new attribute value or only the old attribute value. For example, an HR database as a data source may indicate that an employee's birth date is Dec. 11, 1965, but a Payroll database may indicate that the birth date is Dec. 12, 1965. Thus, one approach would be to use the first value, from the HR database, and another approach would be the second value from the Payroll database. A third approach would be to use the attribute value from the first agent for an "authoritative" data source.

Another approach to the issue of inconsistent attribute values is to allow attributes to contain multiple values, i.e. by additional entries in the Attributes table 311. During visualization, all alternate values would be presented to the user. Still another approach would be to instantiate another object of the same class and initialize the other object with the seed information and the results of the agent.

Yet another approach is a hybrid of the above approaches, by evaluating how well new information obtained from an agent matches an instance being resolved and conditionally overriding the attribute information or creating another instance. For example, the system may compute a "match" ratio of the number of common attributes having the same value (between the attribute values discovered by an agent and an instance being resolved) to the number of common attributes. If the match ratio exceeds a prespecified "match threshold," then the new attribute values would override the inconsistent attribute values. On the other hand, if the match ratio does not exceed the match threshold, then a new object is instantiated using the newly discovered information and the seed values.

At step 610, the server checks whether there are agents remaining to be invoked. Generally, all the class agents and non-local superclass agents for the instance being resolution are invoked in sequence; however, an invoked agent may return a return code indicating that subsequent agents may not be invoked to resolve the instance. For example, an agent may detect that a seed is invalid, e.g. a bad social security number, or that an authoritative database lacks the information, e.g. looking for a country called "Utopia" in a United Nations database. In this situation, the agent returns a "Fail and Quit" return code.

Another situation in which an agent may prevent subsequent agents from being invoked occurs when the agent discovers new information that is authoritative, meaning that it would pointless to look elsewhere. For example, there is no need to look for a country called "United States of America" when the aforementioned authoritative U.N. database indicates that the Unites States is indeed a country. In this situation, the agent returns a "Refresh and Quit" return code. The "Refresh" portion of the return code indicates that a new version of the visualization that takes the new information into account ought to be transmitted to the client browser, e.g. by a server "push" mechanism well-known in the art.

Other return codes, i.e., a "Fail and Continue" return code and a "Refresh and Continue" return code, indicate that the next agent in sequence ought to be invoked. Accordingly, if there is another agent to invoke, execution loops back to step 600. The difference between the "Fail and Continue" return code and the "Refresh and Continue" return code is that the latter return code indications that a new version of the visualization ought to be pushed to the client browser. Consequently, information that is discovered can immediately be visualized, so the user need not wait for all the agents to complete before seeing anything.

By invoking specialized agents associated with each object, knowledge about information discovery is distributed among the objects themselves. Each object, via the agent information discovery mechanism, "knows" how to find more information about itself, i.e. where to look and how to interpret was is found there. As a result, search strategies can be stored and automated for collecting and organizing related information from a diversity of data sources, even when located at different sites in a computer network, e.g. the Internet, or encoded in different, incompatible formats. Thus, the present invention enhances the usefulness and efficiency of information discovery for users who co-ordinate information at work or browse the web at home.

In the process of information discovery, an object of one class may become an object of another class, causing an entire new set of agents to be invoked. For example, an agent for a "company" object might discover that the object is a publicly-owned company with an additional set of agents to search for financial reports. Consequently, an embodiment of the present invention fosters an opportunistic and serendipitous information discovery process.

Automatic Content Classification

In the course of information discovery it is possible for the web server to find a large number of content items in response to a query from a user. Accordingly, one embodiment of the present invention performs automatic content classification of an object's content items for visualization. Automatic classification places each item into a particular bin for each of several possible classification criteria. In this manner, the web server automatically performs a "hit analysis" of the query results so that the user can more easily ascertain by browsing to a relevant bin for items that are most relevant to the user.

Figure 7:
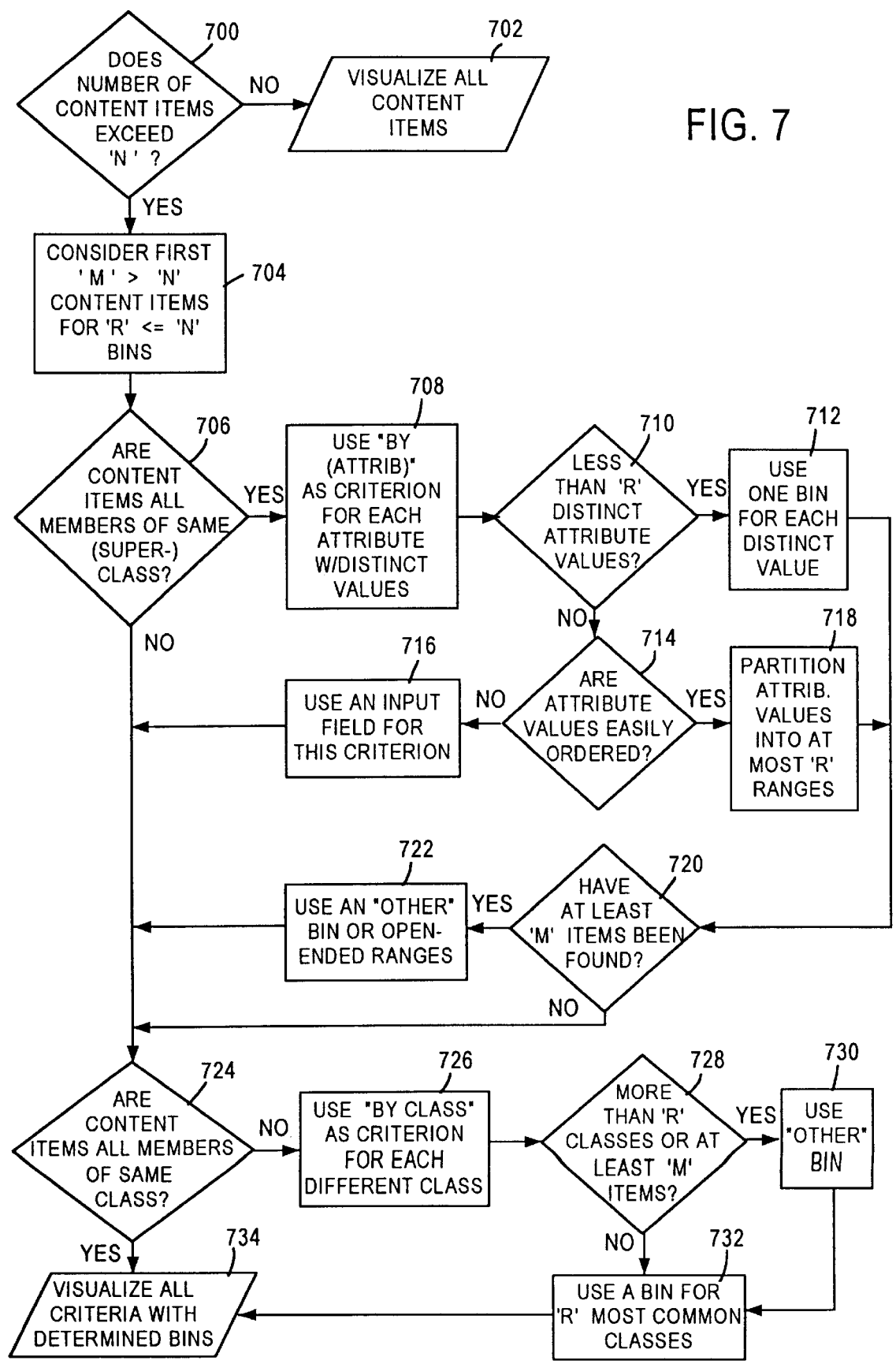
FIG. 7 is a flowchart illustrating the operation of automatic content analysis.

Referring to FIG. 7, depicted is a flowchart illustrating the operation of automatic content classification. The method of automatic content classification is generic and operates with respect to predefined parameters. In step 700, the number of content items is compared a predefined threshold parameter 'N'. The threshold parameter 'N' indicates how many content items must be present in order to trigger the automatic content analysis. While the present invention does not contemplate any particular positive value for a predefined threshold 'N', a good value for 'N' would be about a screenful of content items when visualized, e.g. around 20 to reduce scrolling. If the number of content items does not exceed the predefined threshold 'N', then all the content items are visualized in a list or a space (step 702).

On the other hand, if the number of content items does exceed the predefined threshold 'N', then the first 'M' items, where 'M'>'N', are considered for classification purposes into 'R'<='N' bins (step 704). If all the content items are members of a same class or superclass (e.g., when visualizing the contents of a bin classified by class) (step 706), then execution proceeds to step 708. Since the content items are members of the same (super) class, each attribute of that class is chosen as a criterion if and only if there are at least two instances having a different value for that attribute (step 708). Bins for each criterion are chosen according to the following steps.

If there are less than 'R' distinct values for the attribute from among the first 'M' content items (step 710), then each distinct attribute value is used as a bin (step 712). On the other hand, if the number of distinct attribute value is greater or equal to the predefined parameter 'R', the values of the attributes are checked, in step 714, to see if they are easily ordered, for example, having a similar format (e.g. all numbers or dates) or being short text strings (e.g. a dozen letters). If the attributes are easily ordered, then, in step 718, the attribute values are partitioned into a series of at most 'R' ranges of roughly equal sizes, for determining the bins. For example, this process may yield bins labeled "A–G", "H–N", "O–S", and "T–Z".

If the number of content items exceed the predefined 'M' parameters (step 720), then the bins are readjusted in step 722. If the bins designate distinct values (i.e., if step 712 was performed), then and "other" bin is added. If the bins designate ranges, then using open boundaries for the first and last bins, e.g. "<10", "10–20", and ">20", are used (i.e., if step 718) was performed.

At step 714, it may be determined that the attribute values might not be easily ordered, for example because they mix numbers and text or include long strings. Accordingly, the system provides an input field for a search string to match against the attribute (step 716).

If the first 'M' items are not all members of the same class, even if members of the same superclass, (step 706), then the classification criterion becomes "By Class" (step 726). In this case, class names of the different classes of the first 'M' items are used as bin categories. If there are other, different classes among the items beyond the first 'M' items, or if the number of classes exceed 'R' (step 728), the system provides an "other" bin for these classes (step 730). Up to 'R' bins of the most common classes are designated for use in the visualization (step 732).

At step 734, the system visualizes the instances with the determined bins. Specifically, the user is presented with a list of the bins for that criterion so that the user may navigate to one of the bins for visualization of its contents. Each bin is presented as a hyperlink for ease of activation by a user. When the contents of the selected bin are selected for further visualization, automatic hit analysis is performed again on the bin, by performing steps 700 to 724 as necessary.

Figure 8:
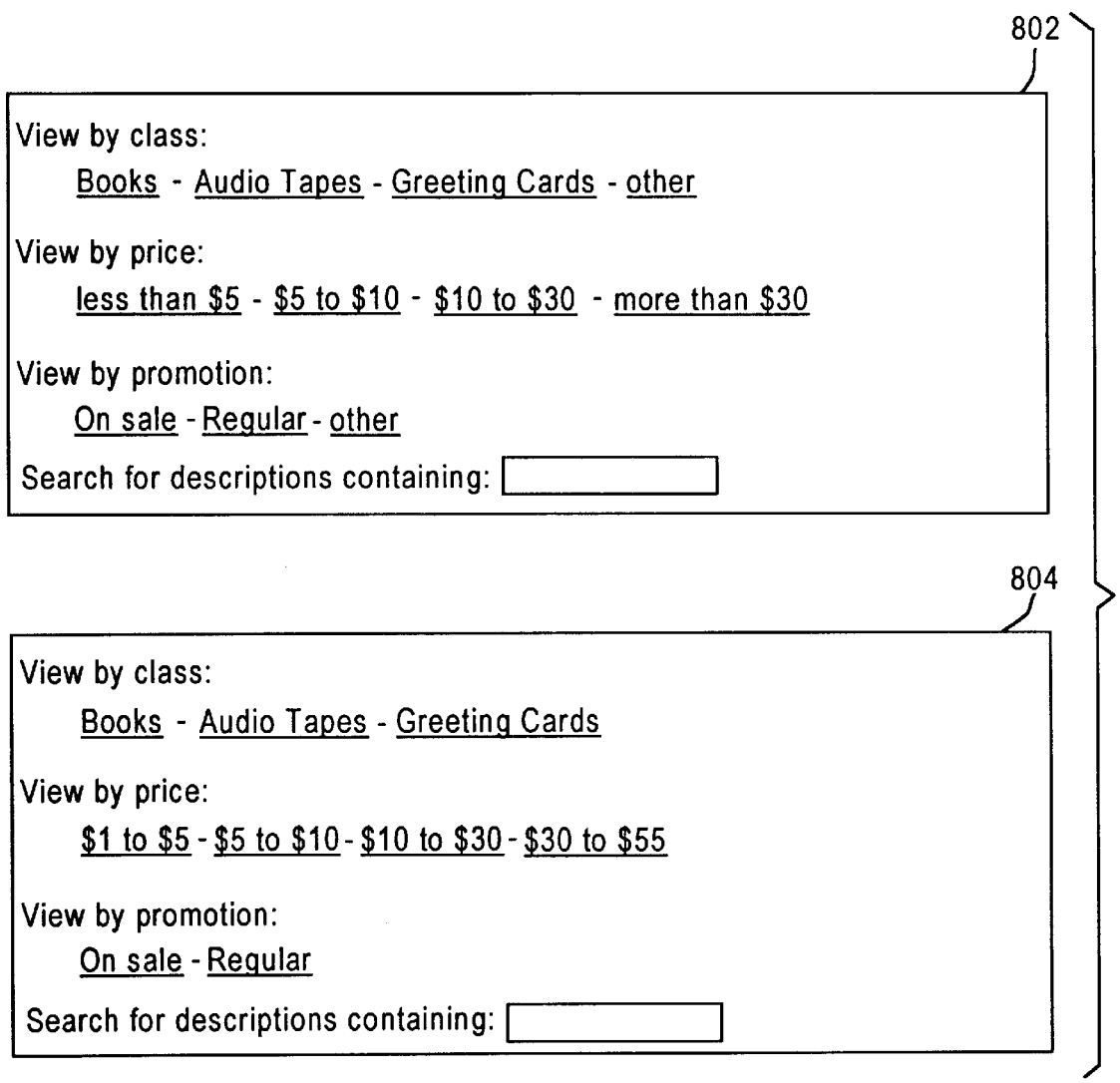
FIG. 8 depicts screen displays of an automatic content analysis according to one embodiment.

Referring to FIG. 8, illustrated are two screen displays 802 and 804 depicting exemplary visualized results of a hit analysis of the content of a modeled bookstore. In response to a query, the server may find a number of objects, belong to one of the following classes: "book," "audio tape," "greeting card," etc. Accordingly, the visualization criterion of "view by class" is used. The objects all are members of a common superclass, "Product", and share the attributes of "price," "promotion," and "description". If at least 'M' objects were found, then screen display 802 depicts a possible visualization, using an "other" bin for "view by class" and "view by promotion" criteria. In addition, a "view by price" criterion includes open ranges, i.e., "less than $5" and "more than $30". In contrast, if less than 'M' objects were found, then the "other" bin and closed ranges are used, as screen display 804 illustrates. In either case, since the "description" attribute is not easily ordered, a search field is provided.

Since displaying an input field for searching only occurs as a last resort, a user can usually examine the bins and criteria by using ordinary browsing commands (e.g. activating a hyperlink with a mouse) with a reduced need to enter additional input via a keyboard. Automatic content classification thus allows a user to quickly and effectively sift through query results with a large number of "hits."

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of interactive information discovery for a server, comprising the computer-implemented steps of:

accessing a first class description of a first body of data, said first body of data containing a plurality of second bodies of data;

accessing a second class description of the second bodies of data;

receiving a first input from a user that identifies the first body of data;

in response to receiving the input, (a) gathering information from a plurality of data sources based on the first class description and the first input and (b) structuring the information in the first body of data based on the first class description;

while gathering the information for the first body of data, detecting for a plurality of values for the respective second bodies of data and, in response to detecting the plurality of values, initializing the second bodies of data based on the respective values; and outputting to the user at least some of the first body of data.

2. The method of claim 1, wherein:

the step of accessing a first class description of a first body of data includes the step of accessing descriptions of attributes for the first body of data, one of the attributes indicating executable instructions for gathering the information for at least some of the attributes from the data sources based on the input; and the step of gathering information from a plurality of data sources includes the step of invoking of executable instructions.

3. The method of claim 2, wherein the step of gathering information from a plurality of data sources includes the step of gathering the information from data sources located respectively at a plurality of remote servers.

4. The method of claim 2, wherein the step of gathering information from a plurality of data sources includes the step of gathering the information from data sources having respectively a plurality of incompatible data formats.

5. The method of claim 1, further comprising the computer-implemented step of outputting to the user a list of the plurality of second bodies of data.

6. The method of claim 1, further comprising the computer-implemented steps of:

automatically classifying the plurality of second bodies of data into one or more bins based on the second class description; and outputting to the user a list of the one or more bins.

7. The method of claim 1, wherein the step of gathering information from a plurality of data sources includes the computer-implemented steps of transmitting a value to a remote sever configured to receive the value and, in response, to perform the steps of:

accessing a third class description of a third body of data stored at the remote server;

gathering second information from a third plurality of third data sources based on the third class description and the value; and structuring the third information in the third body of data based on the third class description.

8. The method of claim 1, further comprising the computer-implemented steps of:

accessing a plurality of descriptions of visual representations for the body of data;

receiving a second input from the first user indicating a first visual representation from among the plurality of visual representations; and outputting to the first user at least some of the first body of data based on a description stored for the first visual representation.

9. The method of claim 1, wherein the step of receiving a first input includes the step of receiving a browsing command.

10. The method of claim 1, wherein the step of outputting to the user at least some of the first body of data includes the step of displaying said at least some of the first body of data with an advertisement.

11. The method of claim 1, further comprising the computer-implemented steps of:

accessing expiration information about the first body of data;

determining whether the first body of data has expired based on the expiration information; and deleting the first body of data.

12. The method of claim 13, further comprising the computer-implemented steps of:

while gathering the information, detecting for a value that identifies a third body of data and in response to detecting the value, (1) gathering third information from the plurality of data sources based on the first description and the value and (2) structuring the third information in the third body of data based on the first description.

13. A method of interactive, information discovery for a server, comprising the computer-implemented steps of:

accessing a first description of a first body of data;

receiving a first input from a user that identifies the first body of data;

in response to receiving the input, (a) gathering information from a plurality of data sources based on the first description and the first input and (b) structuring the information in the first body of data based on the first description;

accessing a second description of a second body of data;

while gathering the information, detecting for a value that indicates a change in class;

in response to detecting the value, (1) restructuring the first body of data to comport with the second description and (2) gathering second information from the plurality of data sources based on the second description and the value; and outputting to the user at least some of the first body of data.

14. A computer readable medium bearing sequences of instructions for interactive information discovery for a server, said sequences of instructions including sequences of instructions for performing the steps of:

accessing a first class description of a first body of data, said first body of data containing a plurality of second bodies of data;

accessing a second class description of the second bodies of data;

receiving a first input from a user that identifies the first body of data;

in response to receiving the input, (a) gathering information from a plurality of data sources based on the first class description and the first input and (b) structuring the information in the first body of data based on the first class description;

while gathering the information for the first body of data, detecting for a plurality of values for the respective second bodies of data and, in response to detecting the plurality of values, initializing the second bodies of data based on the respective values; and outputting to the user at least some of the first body of data.

15. The computer readable medium of claim 14, wherein:

the step of accessing a first class description of a first body of data includes the step of accessing descriptions of attributes for the first body of data, one of the attributes indicating executable instructions for gathering the information for at least some of the attributes from the data sources based on the input; and the step of gathering information from a plurality of data sources includes the step of invoking of executable instructions.

16. The computer readable medium of claim 15, wherein the step of gathering information from a plurality of data sources includes the step of gathering the information from data sources having respectively a plurality of incompatible data formats.

17. The computer readable medium of claim 14, wherein said sequences of instructions further include sequences of instructions for performing the step of outputting to the user a list of the plurality of second bodies of data.

18. The computer readable medium of claim 14, wherein said sequences of instructions further include sequences of instructions for performing the steps of:

automatically classifying the plurality of second bodies of data into one or more bins based on the second class description; and outputting to the user a list of the one or more bins.

19. The computer readable medium of claim 15, wherein the step of gathering information from a plurality of data sources includes the step of gathering the information from data sources located respectively at a plurality of remote servers.

20. The computer readable medium of claim 14, wherein the step of gathering information from a plurality of data sources includes the computer-implemented steps of transmitting a value to a remote server configured to receive the value and, in response, to perform the steps of:

accessing a third class description of a third body of data stored at the remote server;

gathering second information from a third plurality of third data sources based on the third class description and the value; and structuring the third information in the third body of data based on the third class description.

21. The computer readable medium of claim 14, wherein said sequences of instructions further includes sequences of instructions for performing the steps of:

accessing a plurality of descriptions of visual representations for the body of data;

receiving a second input from the first user indicating a first visual representation from among the plurality of visual representations; and outputting to the first user at least some of the first body of data based on a description stored for the first visual representation.

22. The computer readable medium of claim 14, wherein the step of receiving a first input includes the step of receiving a browsing command.

23. The computer readable medium of claim 14, wherein the step of outputting to the user at least some of the first body of data includes the step of displaying said at least some of the first body of data with an advertisement.

24. The computer readable medium of claim 14, wherein said sequences of instructions further include sequences of instructions for performing the steps of:

accessing expiration information about the first body of data;

determining whether the first body of data has expired based on the expiration information; and deleting the first body of data.

25. A computer readable medium bearing sequences of instructions for interactive information discovery for a server, said sequences of instructions including sequences of instructions for performing the steps of:

accessing a first description of a first body of data;

receiving a first input from a user that identifies the first body of data;

in response to receiving the input, (a) gathering information from a plurality of data sources based on the first description and the first input and (b) structuring the information in the first body of data based on the first description;

accessing a second description of a second body of data;

while gathering the information, detecting for a value that indicates a change in class;

in response to detecting the value, (1) restructuring the first body of data to comport with the second description and (2) gathering second information from the plurality of data sources based on the second description and the value; and outputting to the user at least some of the first body of data.

26. The computer readable medium of claim 25, wherein said sequences of instructions further includes sequences of instructions for performing the steps of:

while gathering the information, detecting for a value that identifies a third body of data and in response to detecting the value, (1) gathering third information from the plurality of data sources based on the first description and the value and (2) structuring the third information in the third body of data based on the first description.

* * * * *